United States Patent
Hsieh et al.

(10) Patent No.: US 10,578,956 B2
(45) Date of Patent: Mar. 3, 2020

(54) PROJECTOR AND WAVELENGTH-CONVERTING ELEMENT

(71) Applicant: Coretronic Corporation, Hsin-Chu (TW)

(72) Inventors: Chi-Tang Hsieh, Hsin-Chu (TW); Chia-Lun Tsai, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/190,173

(22) Filed: Nov. 14, 2018

(65) Prior Publication Data

US 2019/0146318 A1 May 16, 2019

(30) Foreign Application Priority Data

Nov. 15, 2017 (CN) .......................... 2017 1 1129249

(51) Int. Cl.
*G03B 21/20* (2006.01)
*F21V 9/38* (2018.01)
*F21V 9/32* (2018.01)

(52) U.S. Cl.
CPC .............. *G03B 21/204* (2013.01); *F21V 9/32* (2018.02); *F21V 9/38* (2018.02)

(58) Field of Classification Search
CPC . G03B 21/204; F21V 9/30; F21V 9/32; F21V 9/38
See application file for complete search history.

(56) References Cited

U.S. PATENT DOCUMENTS 8,616,708 B2 * 12/2013 Masuda ................. G03B 21/14
353/84
9,733,557 B2 * 8/2017 Furuyama ............ G02B 26/008
(Continued)

FOREIGN PATENT DOCUMENTS

| CN | 102650814 | 8/2012 |
| CN | 101936505 | 3/2013 |

(Continued)

OTHER PUBLICATIONS

Cao et al, "Light Source System and Projection Device", Aug. 29, 2012, Espacenet, Patent Translation of CN102650814A, pp. 1-20.*

*Primary Examiner* — Alan B Cariaso
(74) *Attorney, Agent, or Firm* — JCIPRNET (57) ABSTRACT

A projector and a wavelength-converting element are disclosed. The projector includes an illumination system, a light valve and a lens. The illumination system includes a light source providing an excitation beam, and a wavelength conversion device located at a transmission path of the excitation beam. The wavelength-converting element includes a substrate having a wavelength-converting area, an optical film disposed in the wavelength-converting area of the substrate, and a fluorescent film covering the optical film and converts the excitation beam into a converting beam. The converting beam and the excitation beam constitute an illumination beam. The fluorescent film contains phosphors, wherein the phosphors having a larger particle size are distributed among or above the phosphors having a smaller particle size. The light valve converts the illumination beam into an image beam. The image beam becomes a projection beam after passing through the lens.

18 Claims, 5 Drawing Sheets

(56) References Cited

U.S. PATENT DOCUMENTS

| | | | |
|---|---|---|---|
| 10,288,872 B2* | 5/2019 | Li | G02B 26/008 |
| 2013/0088689 A1* | 4/2013 | Lin | G03B 21/204 |
| | | | 353/31 |
| 2013/0242534 A1 | 9/2013 | Pettitt et al. | |
| 2013/0334553 A1 | 12/2013 | Yeh et al. | |
| 2015/0185596 A1* | 7/2015 | Hsieh | G03B 21/204 |
| | | | 353/84 |
| 2015/0362830 A1 | 12/2015 | Liao et al. | |
| 2017/0269464 A1 | 9/2017 | Tsai et al. | |
| 2018/0108814 A1* | 4/2018 | Zheng | H01L 33/502 |
| 2019/0075276 A1* | 3/2019 | Hashizume | H04N 9/3138 |
| 2019/0101814 A1* | 4/2019 | Yamaguchi | G03B 21/204 |

FOREIGN PATENT DOCUMENTS

| | | |
|---|---|---|
| CN | 103715344 | 4/2014 |
| CN | 103968332 | 8/2014 |
| CN | 203932671 | 11/2014 |
| CN | 104516180 | 4/2015 |
| CN | 104566230 | 4/2015 |
| CN | 104597698 | 5/2015 |
| CN | 104713035 | 6/2015 |
| CN | 104865670 | 8/2015 |
| JP | 2013061525 | 4/2013 |
| TW | 201435469 | 9/2014 |
| TW | 201518843 | 5/2015 |
| TW | 201523115 | 6/2015 |
| TW | 201546495 | 12/2015 |

\* cited by examiner

PROJECTOR AND WAVELENGTH-CONVERTING ELEMENT

CROSS-REFERENCE TO RELATED APPLICATION

This application claims the priority benefit of China application serial no. 201711129249.2, filed on Nov. 15, 2017. The entirety of the above-mentioned patent application is hereby incorporated by reference herein and made a part of this specification.

BACKGROUND

Technical Field

The disclosure relates to a projector and a wavelength-converting element, particularly to a projector and a wavelength-converting element enhanced in wavelength converting efficiency.

Description of Related Art

Using a light source such as laser or a light emitting diode (LED) to excite phosphors so as to obtain a predetermined colored light is a technical solution widely applied in fields such as illumination light sources, projection display and so on.

In a conventional wavelength-converting element, phosphors usually have a single particle size, which results in a distribution of single particle size in a wavelength converting-layer composed of the phosphors cannot be correspond to a power density distribution of an excitation beam.

Generally, in order to enhance converting efficiency of the excitation beam, the concentration of the phosphors may be increased. However, this may affect adhesion properties of the phosphor layer, resulting in a reduction in adhesion force between the phosphors and a carrier board. In addition, an excessively high concentration of the phosphors may lead to a reduction in light converting efficiency.

In another method, the wavelength-converting element may be used in combination with a carrier board having a mirror reflection effect to improve the overall reflection efficiency. However, low surface roughness of the carrier board having the mirror reflection effect may reduce the adhesion force between the phosphor layer and the carrier board, which may affect product reliability.

SUMMARY

The disclosure provides a projector enhanced in illumination effects.

The disclosure provides a wavelength-converting element enhanced in wavelength converting efficiency and reliability.

A projector according to the disclosure includes an illumination system, a light valve and a lens. The illumination system includes a light source and a wavelength-converting element, wherein the light source is configured to provide an excitation beam, the wavelength-converting element is located at a transmission path of the excitation beam, and the wavelength-converting element includes a substrate, an optical film and a fluorescent film. The substrate has a central area and a wavelength-converting area, wherein the wavelength-converting area surrounds at least part of the central area. The optical film is disposed in the wavelength-converting area of the substrate. The fluorescent film is disposed in the wavelength-converting area of the substrate and covers the optical film, and the fluorescent film is configured to convert the excitation beam into a converting beam, wherein the converting beam and the excitation beam constitute an illumination beam. The fluorescent film contains a plurality of phosphors having a plurality of particle sizes, the plurality of particle sizes including a first particle size and a second particle size, the first particle size being greater than the second particle size, wherein the phosphors having the first particle size are distributed among or above the phosphors having the second particle size. The light valve is located at a transmission path of the illumination beam, and is configured to convert the illumination beam into an image beam. The lens is located at a transmission path of the image beam, wherein the image beam is for becoming a projection beam after passing through the lens.

A wavelength-converting element according to the disclosure includes a substrate, an optical film and a fluorescent film. The substrate has a central area and a wavelength-converting area, wherein the wavelength-converting area surrounds at least part of the central area. The optical film is disposed in the wavelength-converting area of the substrate. The fluorescent film is disposed in the wavelength-converting area of the substrate and covers the optical film. The fluorescent film contains a plurality of phosphors having a plurality of particle sizes, the plurality of particle sizes including a first particle size and a second particle size, wherein the first particle size is greater than the second particle size, and the phosphors having the first particle size are distributed among or above the phosphors having the second particle size.

Based on the above, the fluorescent film of the wavelength-converting element used in the projector according to embodiments of the disclosure is formed of phosphors having different particle sizes, wherein the particle with different sizes of the phosphors is distributed corresponding with a power density distribution of the excitation beam, so as to effectively enhance wavelength converting efficiency of the wavelength-converting element and the projector using the wavelength-converting element.

To make the aforementioned and other features and advantages of the disclosure more comprehensible, several embodiments accompanied with drawings are described in detail as follows.

DESCRIPTION OF THE EMBODIMENTS

Figure 1:
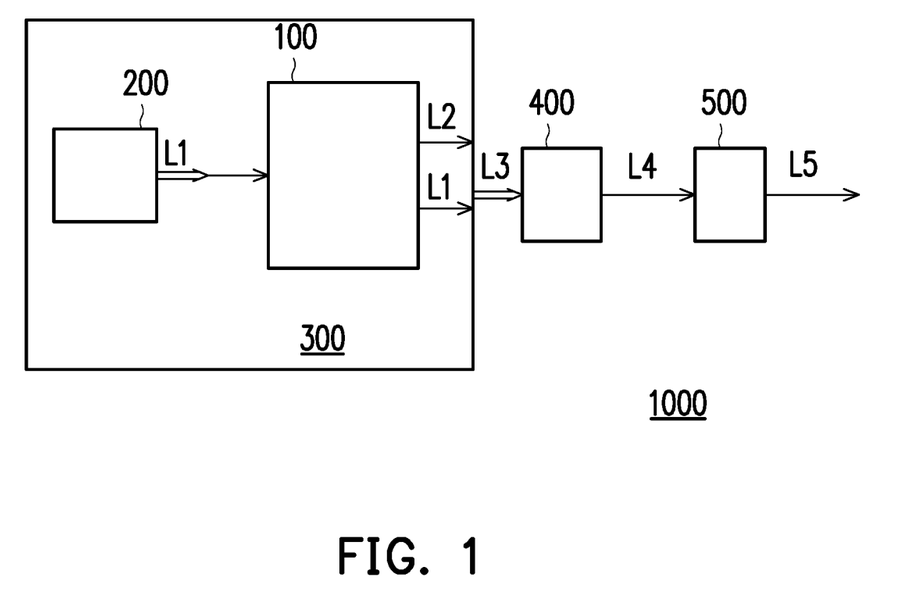
FIG. 1 is a schematic view of a projector according to an embodiment of the disclosure.
Figure 2A:
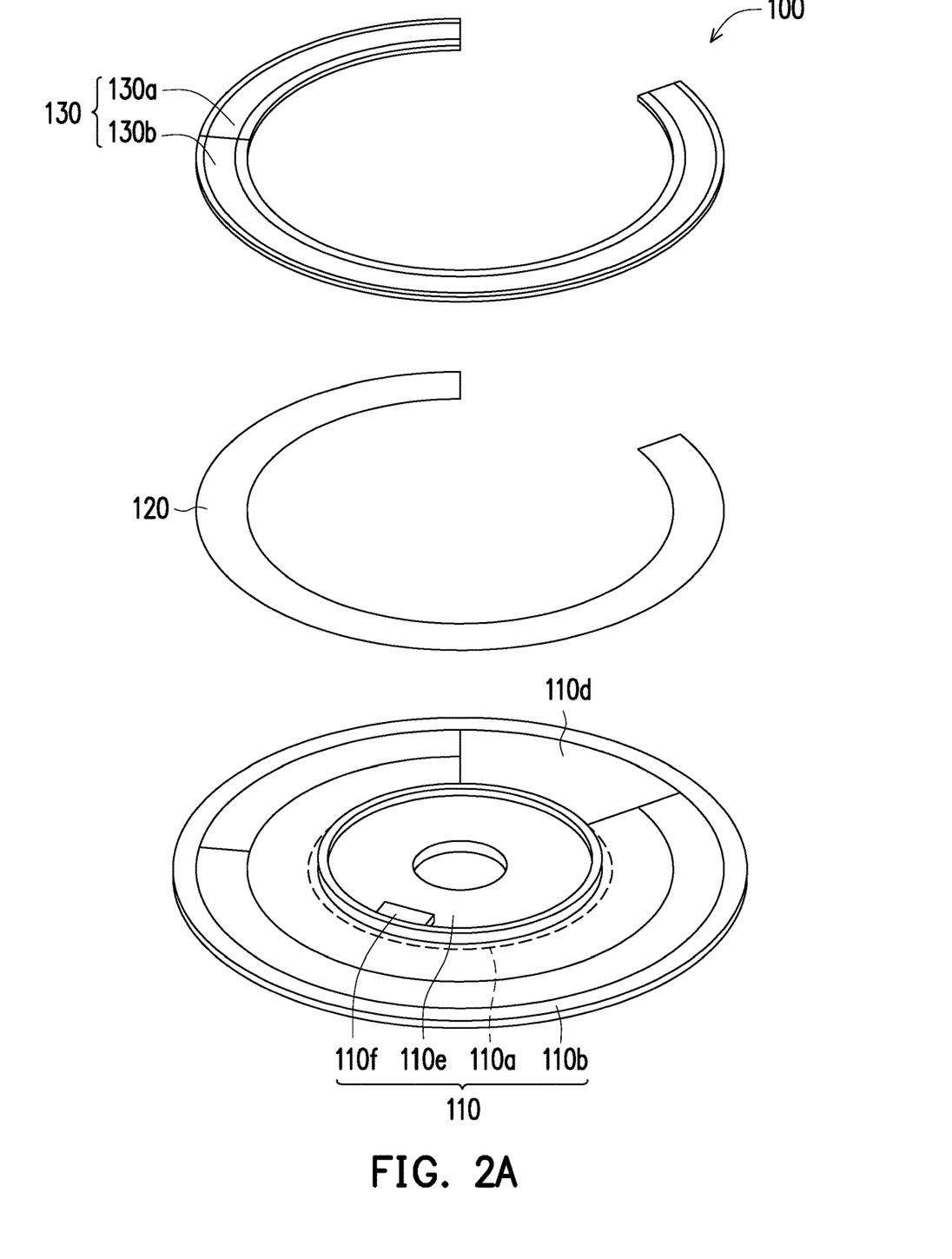
FIG. 2A is a schematic exploded view of a wavelength-converting element in an illumination system according to an embodiment of the disclosure.

FIG. 1 is a schematic view of a projector according to an embodiment of the disclosure, and FIG. 2A is a schematic exploded view of a wavelength-converting element in an illumination system according to an embodiment of the disclosure. Referring to FIG. 1A and FIG. 2A, a projector 1000 of the present embodiment includes an illumination system 300, a light valve 400 and a lens 500. The illumination system 300 includes a light source 200 and a wavelength-converting element 100, wherein the light source 200 is, for example, a blue laser diode or blue light emitting diode. However, the disclosure is not limited thereto. The light source 200 is configured to provide an excitation beam L1, and the wavelength-converting element 100 is located at a transmission path of the excitation beam L1. The wavelength-converting element 100 includes a substrate 110, an optical film 120 and a fluorescent film 130. The substrate 110 has a central area 110a and a wavelength-converting area 110b, wherein the wavelength-converting area 110b surrounds at least part of the central area 110a. Both the optical film 120 and the fluorescent film 130 are disposed in the wavelength-converting area 110b of the substrate 110, wherein the fluorescent film 130 covers the optical film 120. The fluorescent film 130 is configured to convert the excitation beam L1 into a converting beam L2, and the converting beam L2 and the excitation beam L1 constitute an illumination beam L3 which is then transmitted to the light valve 400. The light valve 400 is located at a transmission path of the illumination beam L3, and is configured to convert the illumination beam L3 into an image beam L4. The lens 500 is located at a transmission path of the image beam L4, and the image beam L4 is for becoming a projection beam L5 after passing through the lens 500.

In the present embodiment, the light valve 400 may be a digital micromirror device (DMD), a liquid crystal on silicon (LCoS) panel or a liquid crystal display (LCD) panel. However, the disclosure is not limited thereto.

In the present embodiment, the wavelength-converting element 100 is a reflective phosphor wheel. Thus, a light reflection area 110d is provided between two ends of the wavelength-converting area 110b of the substrate 110, wherein the light reflection area 110d includes at least one of metal, ceramic and glass having a reflective coating, so as to reflect unexcited blue light. However, the disclosure is not limited thereto.

In another embodiment not illustrated, the light reflection area 110d may be replaced with a light transmission area. That is, the light transmission area is located between two ends of the wavelength-converting area 110b, wherein the light transmission area includes at least one of an opening and an antireflection coated glass, and the unexcited blue light provided by the light source 200 may pass through this light transmission area.

Following the above, the wavelength-converting element 100 further includes an annular structure 110e, wherein the annular structure 110e is disposed in the central area 110a of the substrate 110, and the annular structure 110e is a structure protruded from a surface of the substrate 110. However, the disclosure is not limited thereto. In addition, the wavelength-converting element 100 may further include a counterweight 110f, the counterweight 110f being disposed within the annular structure 110e. However, the disclosure is not limited thereto.

In the present embodiment, the substrate 110 of the wavelength-converting element 100 may be formed of at least one selected from a highly thermally conductive metal, ceramic, a high temperature resistant material and a material having a high thermal conductivity coefficient. To put it simply, the substrate 110 may be made of a single material selected from the foregoing materials, or may be made of a combination of the foregoing materials according to needs. In other embodiments, the substrate 110 may be made of at least one of glass and a highly light transmissive material.

The optical film 120 may be first formed in the wavelength-converting area 110b of the substrate 110 by coating or plating. Then, the fluorescent film 130 may be formed in the wavelength-converting area 110b having the optical film 120 therein by coating. The optical film 120 may be formed of at least one material selected from a scattering material having high reflectivity, a reflective material, and a diffusion material. For example, the optical film 120 may be formed of at least one selected from titanium dioxide ($TiO_2$), silicon dioxide ($SiO_2$), aluminum oxide ($AlO_3$), zirconium oxide, titanium aluminum alloy and various oxides.

In the present embodiment, the fluorescent film 130 is formed in the wavelength-converting area 110b of the substrate 110 and covers over the optical film 120. The fluorescent film 130 is formed of phosphors having a plurality of (e.g., two) particle sizes, wherein the "phosphors" mentioned herein means phosphor particles. In the present embodiment, the fluorescent film 130 includes at least one of a green wavelength converting section 130a, a red wavelength converting section (not illustrated) and a yellow wavelength converting section 130b, and the green wavelength converting section 130a, the red wavelength converting section (not illustrated) or the yellow wavelength converting section 130b is formed of a suitable phosphor material selected according to needs. However, the disclosure is not limited thereto.

Figure 2B:
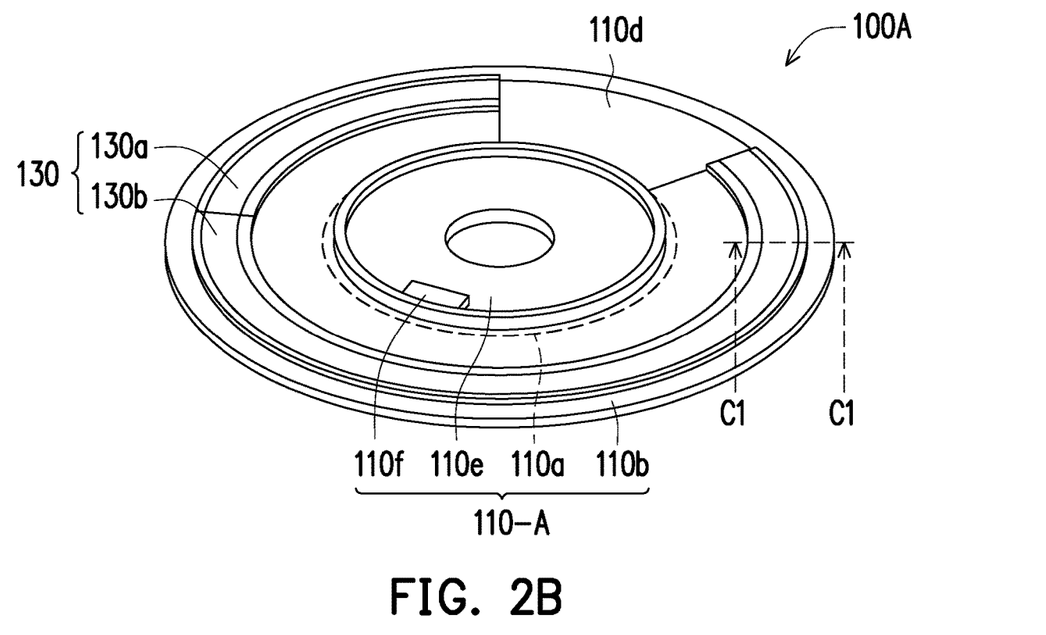
FIG. 2B illustrates an assembled wavelength-converting element in an illumination system according to an embodiment of the disclosure.
Figure 3A:
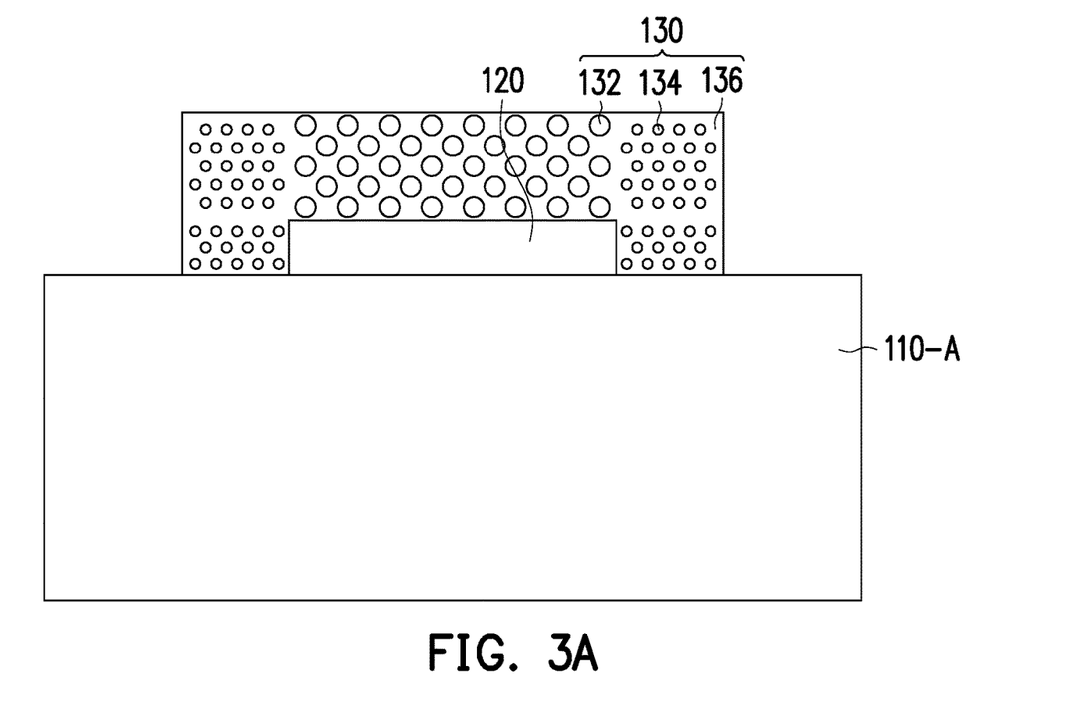
FIG. 3A is a partial cross-sectional view along line C1-C1 shown in FIG. 2B.

In the present embodiment, the particle sizes of the phosphors at least include a first particle size and a second particle size. Referring to FIG. 2B and FIG. 3A, FIG. 2B illustrates an assembled wavelength-converting element in an illumination system according to an embodiment of the disclosure, and FIG. 3A is a partial cross-sectional view along line C1-C1 shown in FIG. 2B. In a wavelength-converting element 100A of the present embodiment, the first particle size is greater than the second particle size, wherein phosphors 132 having the first particle size are distributed among the phosphors 134 having the second particle size. In the present embodiment, coating may be performed twice or more times to form the fluorescent film 130 containing the phosphors 132/134 having different particle sizes. However, the disclosure does not limit how the phosphors 132/134 having different particle sizes are formed. If suitable equipment is available, the fluorescent film 130 may be formed by performing coating only once. In the present embodiment, the phosphors 132/134 may be mixed with a connecting substance 136, and then formed on the optical film 120 by coating, thus forming the fluorescent film 130, wherein the connecting substance 136 is, for example, an adhesive, thus causing the fluorescent film 130 to become a fluorescent glue. However, the disclosure is not limited thereto. In the present embodiment, by adjusting a ratio relationship between the connecting substance 136 (e.g., an adhesive) and the phosphors 132/134, i.e., by adjusting the concentration of the fluorescent glue (the fluorescent film 130), adhesion force between the fluorescent film 130 and a substrate 110-A can be adjusted. In the present embodiment, the edge of the fluorescent film 130 may further be extended to completely cover the optical film 120. That is, the fluorescent film 130 covers a top surface and both side surfaces of the optical film 120.

In the present embodiment, in the case where the fluorescent film 130 is a fluorescent glue composed of the connecting substance 136 and the phosphors 132/134, a desired concentration may also be obtained by adjusting the ratio relationship between the connecting substance 136 and the phosphors 132/134. For example, by combining a larger amount (e.g., more particles) of the phosphors 132 with a smaller amount of the connecting substance 136 and by combining a smaller amount (e.g., fewer particles) of the phosphors 134 with a larger amount of the connecting substance 136, a greater concentration of the phosphors 132 and a smaller concentration of the phosphors 134 can be obtained; similarly, by combining a smaller amount (e.g., fewer particles) of the phosphors 132 with a larger amount of the connecting substance 136 and by combining a larger amount (e.g., more particles) of the phosphors 134 with a smaller amount of the connecting substance 136, a smaller concentration of the phosphors 132 and a greater concentration of the phosphors 134 can be obtained. In the above embodiments, the concentration may be volume percentage concentration or weight percentage concentration. However, the disclosure is not limited thereto.

In detail, as shown in FIG. 3A, each of the phosphors 132 having the first particle size is distributed among the phosphors 134 having the second particle size. In the present embodiment, the phosphors 132 having the first particle size are concentrated above the optical film 120, the phosphors 134 having the second particle size surround an outer periphery of the phosphors 132 having the first particle size, and the phosphors 134 having the second particle size further cover the optical film 120 from outside the optical film 120.

In the present embodiment, the second particle size of the phosphors 134 is smaller than 20 µm. In addition, in the present embodiment, a particle size obtained by mixing the phosphors 132 having the first particle size with the phosphors 134 having the second particle size is also smaller than 20 µm. More specifically, in the present embodiment, phosphor graininess D50 smaller than 20 µm may be achieved by the phosphors 134 having the second particle size, or may be achieved by mixing the phosphors 134 having the second particle size with the phosphors 132 having the first particle size. For example, phosphor graininess D50 of 19 µm may be achieved by the phosphors 132 having the first particle size, and phosphor graininess D50 of 2 µm may be achieved by the phosphors 134 having the second particle size. However, the disclosure is not limited thereto. In the present embodiment, the concentration of the phosphors 132 having the first particle size may be the same as or different from the concentration of the phosphors 134 having the second particle size. Moreover, the concentration of the phosphors 132 having the first particle size may be greater than or less than the concentration of the phosphors 134 having the second particle size. However, the disclosure is not limited thereto. In other embodiments, the fluorescent film 130 may further contain phosphors (not illustrated) having a third particle size, wherein the third particle size (phosphor graininess D50) is smaller than 20 µm, and a particle size (phosphor graininess D50) obtained by mixing the phosphors 132 having the first particle size, the phosphors 134 having the second particle size and the phosphors having the third particle size together is also smaller than 20 µm. To put it simply, the fluorescent film 130 may contain a plurality of phosphors having N particle sizes, and a particle size (phosphor graininess D50) obtained by mixing the plurality of phosphors having N particle sizes is smaller than 20 µm.

Figure 3B:
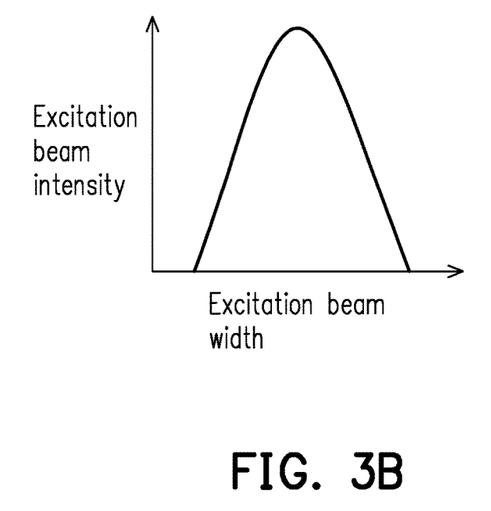
FIG. 3B is a schematic view of a power density distribution of an excitation beam.

FIG. 3B is a schematic view of a power density distribution of an excitation beam. Referring to FIG. 3A and FIG. 3B together, it is clear from FIG. 3B that in the middle of the excitation beam a higher intensity (higher wattage) is present while a lower intensity is present at both sides of the excitation beam. In the present embodiment, by concentrating the phosphors 132 having the first particle size (relatively large particle size) in the middle of the fluorescent film 130, the phosphors 132 having the first particle size (relatively large particle size) are irradiated by the excitation beam having higher intensity, while the phosphors 134 having the second particle size (relatively small particle size) are irradiated by the excitation beam having lower intensity. In this way, the excitation beam with higher intensity obtains an excellent correspondence with the phosphors 132 having the first particle size, so that wavelength converting efficiency of the wavelength-converting element 100A can be effectively enhanced. In the present embodiment, power density of the excitation beam is, for example, power density of a laser spot.

In other possible embodiments, the phosphors 132 having the first particle size, which are concentrated in the middle of the fluorescent film 130, may have a relatively high concentration or may have no defects or fewer defects on their surfaces; the phosphors 134 having the second particle size, which are located at an outer periphery of the fluorescent film 130, may have a relatively low concentration or may be allowed to have some defects on their surfaces. However, the disclosure is not limited thereto. In this way, the effect of effectively enhancing the wavelength converting efficiency of the wavelength-converting element 100A can be achieved.

It is clear from the above that, by selecting particle size, concentration and state of surface defects of the phosphors 132/134 according to an intensity distribution of the excitation beam, requirements with respect to the particle size, the state of surface defects and so on of the phosphors 132/134 used in the fluorescent film 130 of the wavelength-converting element 100A can be suitably relaxed, so that raw material costs of the phosphors 132/134 can be saved.

Figure 4:
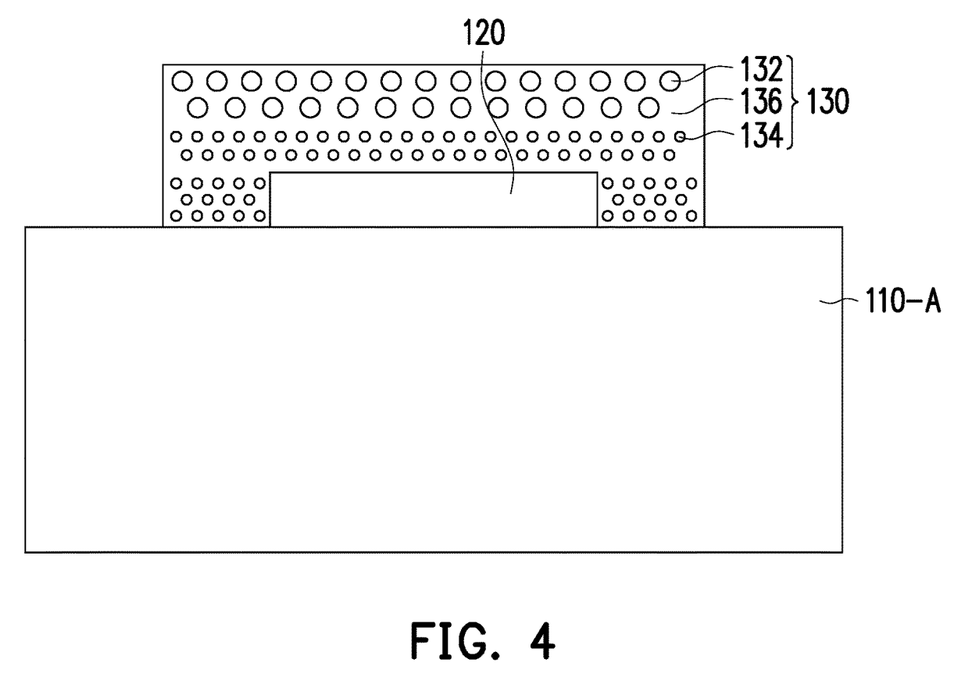
FIG. 4 is a partial cross-sectional view of a wavelength-converting element according to another embodiment.

In the above embodiment, the phosphors 132 having the first particle size and the phosphors 134 having the second particle size may be transversely distributed (horizontally distributed). However, in other embodiments, the phosphors 132 having the first particle size and the phosphors 134 having the second particle size may be longitudinally distributed (vertically distributed). That is, the phosphors 132 having the first particle size may be distributed above the phosphors 134 having the second particle size, as shown in FIG. 4. FIG. 4 is a partial cross-sectional view of a wavelength-converting element according to another embodiment. The present embodiment differs from the previous embodiment in that each of the phosphors 132 having the first particle size is distributed above the phosphors 134 having the second particle size. In the present embodiment, the phosphors 132 having the first particle size (relatively large particle size) exhibit a relatively great excitation effect after being irradiated with the excitation beam, and the phosphors 134 having the second particle size (relatively small particle size) exhibit a relatively small excitation effect after being irradiated with the excitation beam. The disposition manner in the present embodiment may also enable the wavelength-converting element 100A to have good wavelength converting efficiency.

Figure 5:
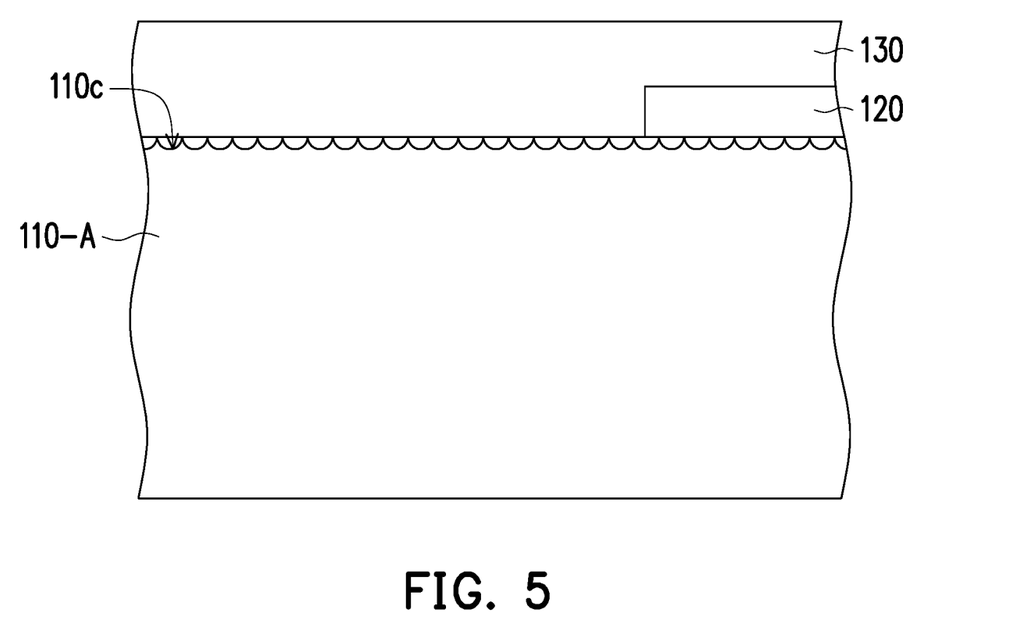
FIG. 5 is a schematic view of a substrate of a wavelength-converting element, the substrate having a rough surface.

FIG. 5 is a schematic view of a substrate of a wavelength-converting element, the substrate having a rough surface. Referring to FIG. 5, to increase adhesion force between the optical film 120, the fluorescent film 130 and the substrate 110-A, the substrate 110-A may further have a rough surface 110c. In the present embodiment, the optical film 120 is connected between the rough surface 110c and the fluorescent film 130. In the present embodiment, by the rough surface 110c, the optical film 120 and the substrate 110-A can be more tightly bound with each other, so that the fluorescent film 130 distributed along an outer periphery of the optical film 120 can also be better bound with the substrate 110-A through the rough surface 110c. In the present embodiment, the rough surface 110c is, for example, a fogged surface (matte surface) or a non-mirror surface, and has surface roughness greater than 10 μm. To put it simply, compared to a mirror surface, the rough surface 110c in the present embodiment has larger adhesion area, thereby improving the overall structural strength.

Figure 6:
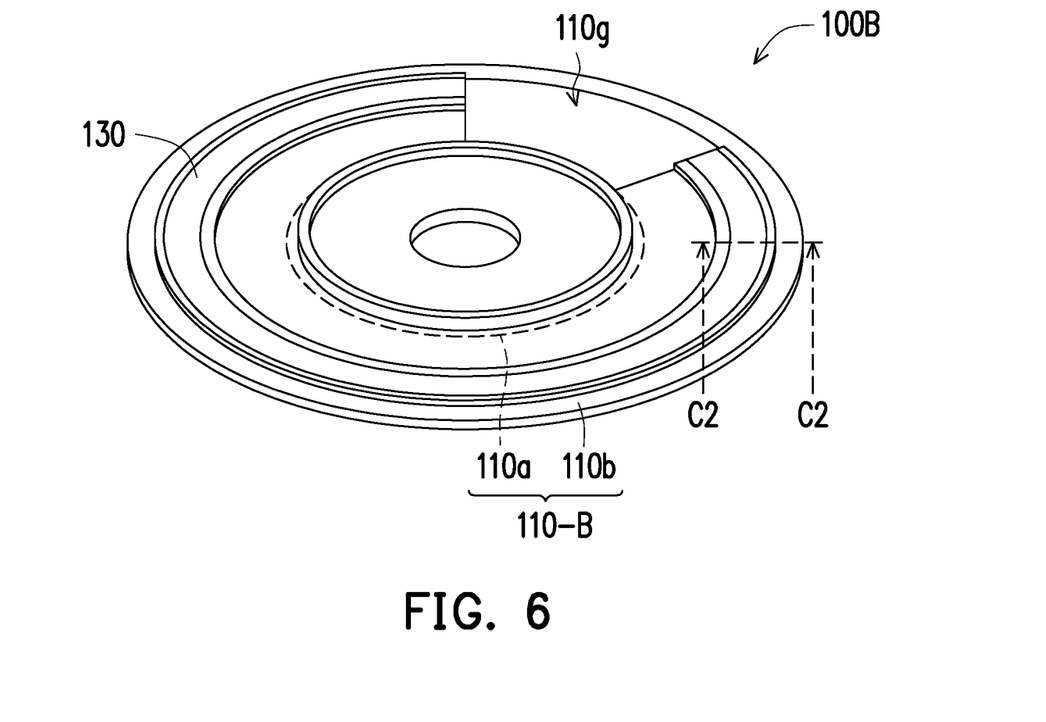
FIG. 6 is a schematic view of a wavelength-converting element in an illumination system according to another embodiment of the disclosure.

FIG. 6 is a schematic view of a wavelength-converting element in an illumination system according to another embodiment of the disclosure. Referring to FIG. 6, related descriptions of the components of a wavelength-converting element 100B of the present embodiment will be omitted since sufficient teachings, suggestions and descriptions of implementation can be obtained from the descriptions of the embodiments of FIG. 2A to FIG. 5. In the present embodiment, the wavelength-converting element 100B includes a substrate 110-B, an optical film (not illustrated) and the fluorescent film 130. The substrate 110-B has the central area 110a and the wavelength-converting area 110b, wherein the wavelength-converting area 110b surrounds at least part of the central area 110a. Both the optical film and the fluorescent film 130 are disposed in the wavelength-converting area 110b of the substrate 110-B, wherein the fluorescent film 130 covers the optical film. In addition, please refer to FIG. 3A and FIG. 4 for a partial cross-sectional view along line C2-C2 shown in FIG. 6. In the wavelength-converting element 100B of the present embodiment, the particle size of the phosphors at least includes the first particle size and the second particle size, the first particle size being greater than the second particle size, wherein the phosphors 132 having the first particle size are distributed among or above the phosphors 134 having the second particle size. In the present embodiment, an optically active area 110g is provided between two ends of the wavelength-converting area 110b, wherein the optically active area 110g may be a light reflection area or a light transmission area. In one embodiment, the light reflection area includes at least one of metal, ceramic and glass having a reflective coating. In one embodiment, the light transmission area includes at least one of an opening and an antireflection coated glass.

In summary, the projector of the embodiments of the disclosure at least has several advantages as listed below.

1. In the fluorescent film of the wavelength-converting element, by disposing the phosphors having a larger particle size corresponding to an area of the excitation beam having a relatively high power density, the wavelength converting efficiency can be effectively enhanced.

2. Since phosphors having difference particle sizes can be used in the fluorescent film, selection criteria for the phosphors can be relaxed, and the selection of phosphors becomes more flexible. Thus, costs can be effectively saved.

3. By providing the substrate with a rough surface, the fluorescent film and the optical film on the rough surface of the substrate can be more tightly bound with the substrate.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projector, comprising an illumination system, a light valve and a lens,
   the illumination system comprising a light source and a wavelength-converting element,
   the light source being configured to provide an excitation beam;
   the wavelength-converting element being located at a transmission path of the excitation beam, the wavelength-converting element comprising a substrate, an optical film and a fluorescent film,
   the substrate having a central area and a wavelength-converting area, wherein the wavelength-converting area surrounds at least part of the central area;
   the optical film being disposed in the wavelength-converting area of the substrate;
   the fluorescent film being disposed in the wavelength-converting area of the substrate and covering the optical film, and the fluorescent film being configured to convert the excitation beam into a converting beam, wherein the converting beam and the excitation beam constitute an illumination beam, the fluorescent film containing a plurality of phosphors having a plurality of particle sizes, the plurality of particle sizes comprising a first particle size and a second particle size, the first particle size being greater than the second particle size, wherein the plurality of phosphors having the first particle size are distributed among or above the plurality of phosphors having the second particle size, each of the phosphors having the first particle size is distributed among the plurality of phosphors having the second particle size, or each of the phosphors having the first particle size is distributed above the plurality of phosphors having the second particle size;

the light valve being located at a transmission path of the illumination beam and being configured to convert the illumination beam into an image beam;

the lens being located at a transmission path of the image beam, wherein the image beam is for becoming a projection beam after passing through the lens.

2. The projector according to claim 1, wherein the optical film is formed of at least one of a scattering material, a reflective material, and a diffusion material.

3. The projector according to claim 1, wherein the optical film is formed of at least one of titanium dioxide, silicon dioxide, aluminum oxide, zirconium oxide, and titanium aluminum alloy.

4. The projector according to claim 1, wherein the fluorescent film further comprises a connecting substance, and the plurality of phosphors are mixed with the connecting substance.

5. The projector according to claim 1, wherein the fluorescent film comprises at least one of a green wavelength converting section, a red wavelength converting section and a yellow wavelength converting section.

6. The projector according to claim 1, wherein the substrate has a rough surface, and the optical film is connected between the rough surface and the fluorescent film.

7. The projector according to claim 1, wherein the substrate is formed of at least one of metal, ceramic, a high temperature resistant material and a material having a high thermal conductivity coefficient.

8. The projector according to claim 1, wherein the substrate further has a light transmission area, the light transmission area is located between two ends of the wavelength-converting area, and the light transmission area comprises at least one of an opening and an antireflection coated glass.

9. The projector according to claim 1, wherein the substrate further has a light reflection area, the light reflection area is located between two ends of the wavelength-converting area, and material of the light reflection area comprises at least one of metal, ceramic and glass having a reflective coating.

10. A wavelength-converting element, comprising a substrate, an optical film and a fluorescent film, the substrate having a central area and a wavelength-converting area, wherein the wavelength-converting area surrounds at least part of the central area;

the optical film being disposed in the wavelength-converting area of the substrate;

the fluorescent film being disposed in the wavelength-converting area of the substrate and covering the optical film, wherein the fluorescent film contains a plurality of phosphors having a plurality of particle sizes, the plurality of particle sizes comprising a first particle size and a second particle size, the first particle size being greater than the second particle size, wherein the plurality of phosphors having the first particle size are distributed among or above the plurality of phosphors having the second particle size, each of the phosphors having the first particle size is distributed among the plurality of phosphors having the second particle size, or each of the phosphors having the first particle size is distributed above the plurality of phosphors having the second particle size.

11. The wavelength-converting element according to claim 10, wherein the optical film is formed of at least one of a scattering material, a reflective material, and a diffusion material.

12. The wavelength-converting element according to claim 10, wherein the optical film is formed of at least one of titanium dioxide, silicon dioxide, aluminum oxide, zirconium oxide, and titanium aluminum alloy.

13. The wavelength-converting element according to claim 10, wherein the fluorescent film further comprises a connecting substance, and the plurality of phosphors are mixed with the connecting substance.

14. The wavelength-converting element according to claim 10, wherein the fluorescent film comprises at least one of a green wavelength converting section, a red wavelength converting section and a yellow wavelength converting section.

15. The wavelength-converting element according to claim 10, wherein the substrate has a rough surface, and the optical film is connected between the rough surface and the fluorescent film.

16. The wavelength-converting element according to claim 10, wherein the substrate is formed of at least one of metal, ceramic, a high temperature resistant material and a material having a high thermal conductivity coefficient.

17. The wavelength-converting element according to claim 10, wherein the substrate further has a light transmission area, the light transmission area is located between two ends of the wavelength-converting area, and the light transmission area comprises at least one of an opening and an antireflection coated glass.

18. The wavelength-converting element according to claim 10, wherein the substrate further has a light reflection area, the light reflection area is located between two ends of the wavelength-converting area, and material of the light reflection area comprises at least one of metal, ceramic and glass having a reflective coating.

* * * * *